US007614016B2

(12) United States Patent
Wong et al.

(10) Patent No.: US 7,614,016 B2
(45) Date of Patent: Nov. 3, 2009

(54) MULTIPLE ROOTS IN NAVIGATION PANE

(75) Inventors: Lyon K. F. Wong, Issaquah, WA (US);
David G. De Vorchik, Seattle, WA (US);
Relja B. Ivanovic, Seattle, WA (US);
Stephan Hoefnagels, Seattle, WA (US);
Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/110,770

(22) Filed: Apr. 21, 2005

(65) Prior Publication Data
US 2006/0242604 A1 Oct. 26, 2006

(51) Int. Cl.
*G06F 3/048* (2006.01)
(52) U.S. Cl. .............................. 715/854; 715/853; 707/1
(58) Field of Classification Search .................. 715/854, 715/853; 707/1
See application file for complete search history.

(56) References Cited

U.S. PATENT DOCUMENTS

| | | | |
|---|---|---|---|
| 4,881,179 A | 11/1989 | Vincent | |
| 5,060,135 A | 10/1991 | Levine et al. | |
| 5,241,671 A | 8/1993 | Reed et al. | |
| 5,297,250 A | 3/1994 | Leroy et al. | |
| 5,327,529 A | 7/1994 | Fults et al. | |
| 5,333,266 A | 7/1994 | Boaz et al. | |
| 5,333,315 A | 7/1994 | Saether et al. | |
| 5,388,196 A | 2/1995 | Pajak et al. | |
| 5,420,605 A | 5/1995 | Vouri et al. | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick et al. | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |

(Continued)

FOREIGN PATENT DOCUMENTS

CN 1421800 11/2001

(Continued)

OTHER PUBLICATIONS

Microsoft, Windows XP Professional, copyright (1985-2001).*

(Continued)

*Primary Examiner*—Weilun Lo
*Assistant Examiner*—Phenuel S Salomon
(74) *Attorney, Agent, or Firm*—Shook, Hardy & Bacon LLP

(57) ABSTRACT

A method and system of creating and customizing multiple roots in a navigation pane are described. By selecting desired pages and adding them to the navigation pane, users may create multiple roots with which to navigate. A multiple roots navigation system permits the user to bypass irrelevant pages while reducing the amount of information presented in the navigation pane. The individual root nodes may further be customized to reflect ownership, importance or general aesthetic preferences. Using multiple roots, a user is not restricted to a single hierarchical display structure.

19 Claims, 9 Drawing Sheets

U.S. PATENT DOCUMENTS

| | | |
|---|---|---|
| 5,596,702 A | 1/1997 | Stucka et al. |
| 5,598,524 A | 1/1997 | Johnston, Jr. et al. |
| 5,600,778 A | 2/1997 | Swanson et al. |
| 5,606,669 A * | 2/1997 | Bertin et al. ............... 709/223 |
| 5,625,783 A | 4/1997 | Ezekiel et al. |
| 5,630,042 A | 5/1997 | McIntosh et al. |
| 5,648,795 A | 7/1997 | Vouri |
| 5,652,876 A | 7/1997 | Ashe et al. |
| 5,675,520 A | 10/1997 | Pitt, III et al. |
| 5,680,563 A | 10/1997 | Edelman |
| 5,696,486 A | 12/1997 | Poliquin et al. |
| 5,696,914 A | 12/1997 | Nahaboo et al. |
| 5,710,926 A | 1/1998 | Maurer |
| 5,757,925 A | 5/1998 | Faybishenko |
| 5,760,770 A | 6/1998 | Bliss et al. |
| 5,790,121 A | 8/1998 | Sklar et al. |
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,855,446 A | 1/1999 | Disborg |
| 5,867,163 A | 2/1999 | Kurtenbach |
| 5,870,088 A | 2/1999 | Washington et al. |
| 5,875,446 A | 2/1999 | Brown et al. |
| 5,875,448 A | 2/1999 | Boys et al. |
| 5,878,410 A | 3/1999 | Zbikowski et al. |
| 5,886,694 A | 3/1999 | Breinberg et al. |
| 5,899,995 A | 5/1999 | Millier et al. |
| 5,905,973 A | 5/1999 | Yonezawa et al. |
| 5,907,703 A | 5/1999 | Kronenberg et al. |
| 5,907,837 A | 5/1999 | Ferrel et al. |
| 5,909,540 A | 6/1999 | Carter et al. |
| 5,923,328 A | 7/1999 | Griesmer |
| 5,929,854 A | 7/1999 | Ross |
| 5,930,801 A | 7/1999 | Falkenhainer et al. |
| 5,933,139 A | 8/1999 | Feigner et al. |
| 5,935,210 A | 8/1999 | Stark |
| 5,973,686 A | 10/1999 | Shimogori et al. |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,016,692 A | 1/2000 | Schaenzer et al. |
| 6,021,262 A | 2/2000 | Cote et al. |
| 6,023,708 A | 2/2000 | Mendez et al. |
| 6,024,843 A | 2/2000 | Anderson et al. |
| 6,025,843 A | 2/2000 | Sklar |
| 6,037,944 A | 3/2000 | Hugh |
| 6,055,540 A | 4/2000 | Snow et al. |
| 6,061,059 A | 5/2000 | Taylor et al. |
| 6,061,692 A | 5/2000 | Thomas et al. |
| 6,061,695 A | 5/2000 | Slivka et al. |
| 6,065,012 A | 5/2000 | Balsara et al. |
| 6,078,924 A | 6/2000 | Ainsbury et al. |
| 6,097,389 A | 8/2000 | Morris et al. |
| 6,101,509 A | 8/2000 | Hanson et al. |
| 6,144,968 A | 11/2000 | Zellweger |
| 6,147,601 A | 11/2000 | Sandelman et al. |
| 6,160,552 A | 12/2000 | Wilsher et al. |
| 6,175,364 B1 | 1/2001 | Wong et al. |
| 6,181,342 B1 | 1/2001 | Niblack |
| 6,202,061 B1 | 3/2001 | Khosla et al. |
| 6,216,122 B1 | 4/2001 | Elson |
| 6,237,004 B1 | 5/2001 | Dodson et al. |
| 6,237,011 B1 | 5/2001 | Ferguson et al. |
| 6,240,407 B1 | 5/2001 | Chang et al. |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,268,852 B1 | 7/2001 | Lindhorst et al. |
| 6,275,829 B1 | 8/2001 | Angiulo et al. |
| 6,279,016 B1 | 8/2001 | De Vorchik et al. |
| 6,301,586 B1 | 10/2001 | Yang et al. |
| 6,308,173 B1 | 10/2001 | Glasser et al. |
| 6,317,142 B1 | 11/2001 | Decoste et al. |
| 6,324,551 B1 | 11/2001 | Lamping et al. |
| 6,326,953 B1 | 12/2001 | Wana |
| 6,330,007 B1 | 12/2001 | Isreal et al. |
| 6,339,767 B1 | 1/2002 | Rivette et al. |
| 6,341,280 B1 | 1/2002 | Glass et al. |
| 6,342,907 B1 | 1/2002 | Petty et al. |
| 6,356,863 B1 | 3/2002 | Sayle |
| 6,356,915 B1 | 3/2002 | Chtchetkine et al. |
| 6,363,377 B1 | 3/2002 | Kravets et al. |
| 6,363,400 B1 | 3/2002 | Chtchetkine et al. |
| 6,369,840 B1 | 4/2002 | Barnett et al. |
| 6,377,283 B1 | 4/2002 | Thomas et al. |
| 6,401,097 B1 | 6/2002 | McCotter et al. |
| 6,405,265 B1 | 6/2002 | Kronenberg et al. |
| 6,408,298 B1 | 6/2002 | Van et al. |
| 6,411,311 B1 | 6/2002 | Rich et al. |
| 6,425,120 B1 | 7/2002 | Morganelli et al. |
| 6,425,121 B1 | 7/2002 | Phillips et al. |
| 6,430,575 B1 | 8/2002 | Dourish et al. |
| 6,437,807 B1 | 8/2002 | Berquist et al. |
| 6,438,590 B1 | 8/2002 | Gartner et al. |
| 6,448,985 B1 | 9/2002 | McNally |
| 6,453,311 B1 | 9/2002 | Powers, III |
| 6,453,319 B1 | 9/2002 | Mattis et al. |
| 6,462,762 B1 * | 10/2002 | Ku et al. ............... 715/853 |
| 6,466,228 B1 | 10/2002 | Ulrich et al. |
| 6,466,238 B1 | 10/2002 | Berry et al. |
| 6,466,932 B1 | 10/2002 | Dennis et al. |
| 6,470,344 B1 | 10/2002 | Kothuri et al. |
| 6,473,100 B1 | 10/2002 | Beaumont et al. |
| 6,480,835 B1 | 11/2002 | Light |
| 6,483,525 B1 | 11/2002 | Tange et al. |
| 6,505,233 B1 | 1/2003 | Hanson et al. |
| 6,513,038 B1 | 1/2003 | Hasegawa et al. |
| 6,519,612 B1 | 2/2003 | Howard et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,544,295 B1 | 4/2003 | Bodnar et al. |
| 6,549,217 B1 | 4/2003 | De Greef et al. |
| 6,549,916 B1 | 4/2003 | Sedlar |
| 6,563,514 B1 | 5/2003 | Samar |
| 6,571,245 B2 | 5/2003 | Huang et al. |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman et al. |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono et al. |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,626 B2 | 6/2004 | Brown et al. |
| 6,754,829 B1 | 6/2004 | Butt et al. |
| 6,760,721 B1 | 7/2004 | Chasen et al. |

| | | | | | |
|---|---|---|---|---|---|
| 6,762,776 B2 | 7/2004 | Huapaya | 2002/0019935 A1 | 2/2002 | Andrew et al. |
| 6,762,777 B2 | 7/2004 | Carroll | 2002/0033844 A1 | 3/2002 | Levy et al. |
| 6,763,458 B1 | 7/2004 | Watanabe et al. | 2002/0046232 A1 | 4/2002 | Adams et al. |
| 6,763,777 B1 | 7/2004 | Rosenberg | 2002/0046299 A1 | 4/2002 | Lefeber et al. |
| 6,768,999 B2 | 7/2004 | Prager et al. | 2002/0049717 A1 | 4/2002 | Routtenberg et al. |
| 6,784,900 B1 | 8/2004 | Dobronsky et al. | 2002/0052885 A1 | 5/2002 | Levy |
| 6,784,925 B1 | 8/2004 | Tomat et al. | 2002/0054167 A1 | 5/2002 | Hugh |
| 6,795,094 B1 | 9/2004 | Watanabe et al. | 2002/0059199 A1 | 5/2002 | Harvey |
| 6,801,909 B2 | 10/2004 | Delgado et al. | 2002/0062310 A1 | 5/2002 | Marmor et al. |
| 6,801,919 B2 | 10/2004 | Hunt et al. | 2002/0063734 A1 | 5/2002 | Khalfay et al. |
| 6,803,926 B1 | 10/2004 | Lamb et al. | 2002/0070965 A1 | 6/2002 | Austin |
| 6,813,474 B2 | 11/2004 | Robinson et al. | 2002/0075310 A1 | 6/2002 | Prabhu et al. |
| 6,816,863 B2 | 11/2004 | Bates et al. | 2002/0075312 A1 | 6/2002 | Amadio et al. |
| 6,820,083 B1 | 11/2004 | Nagy et al. | 2002/0075330 A1 | 6/2002 | Rosenzweig et al. |
| 6,823,344 B1 | 11/2004 | Isensee et al. | 2002/0087652 A1 | 7/2002 | Davis et al. |
| 6,826,443 B2 | 11/2004 | Makinen | 2002/0087740 A1 | 7/2002 | Castanho et al. |
| 6,847,959 B1 | 1/2005 | Arrouye et al. | 2002/0087969 A1 | 7/2002 | Brunheroto et al. |
| 6,853,391 B2 | 2/2005 | Bates et al. | 2002/0089540 A1 | 7/2002 | Geier et al. |
| 6,865,568 B2 | 3/2005 | Chau | 2002/0091679 A1 | 7/2002 | Wright |
| 6,871,348 B1 | 3/2005 | Cooper | 2002/0091697 A1 | 7/2002 | Huang et al. |
| 6,876,900 B2 | 4/2005 | Takeda et al. | 2002/0091739 A1 | 7/2002 | Ferlitsch et al. |
| 6,876,996 B2 | 4/2005 | Czajkowski et al. | 2002/0095416 A1 | 7/2002 | Schwols |
| 6,880,132 B2 | 4/2005 | Uemura | 2002/0097278 A1 | 7/2002 | Mandler et al. |
| 6,883,009 B2 | 4/2005 | Yoo | 2002/0100039 A1 | 7/2002 | Iatropoulos et al. |
| 6,883,146 B2 | 4/2005 | Prabhu et al. | 2002/0103998 A1 | 8/2002 | DeBruine |
| 6,906,722 B2 | 6/2005 | Hrebejk et al. | 2002/0104069 A1 | 8/2002 | Gouge et al. |
| 6,910,049 B2 | 6/2005 | Fenton et al. | 2002/0107973 A1 | 8/2002 | Lennon et al. |
| 6,922,709 B2 | 7/2005 | Goodman | 2002/0111942 A1 | 8/2002 | Campbell et al. |
| 6,925,608 B1 | 8/2005 | Neale et al. | 2002/0113821 A1 | 8/2002 | Hrebejk et al. |
| 6,938,207 B1 | 8/2005 | Haynes | 2002/0120505 A1 | 8/2002 | Henkin et al. |
| 6,944,647 B2 | 9/2005 | Shah et al. | 2002/0120604 A1 | 8/2002 | Labarge et al. |
| 6,947,959 B1 | 9/2005 | Gill | 2002/0120757 A1 | 8/2002 | Sutherland et al. |
| 6,948,120 B1 | 9/2005 | Delgobbo et al. | 2002/0129033 A1 | 9/2002 | Hoxie et al. |
| 6,950,818 B2 | 9/2005 | Dennis et al. | 2002/0138552 A1 | 9/2002 | DeBruine et al. |
| 6,950,989 B2 | 9/2005 | Rosenzweig et al. | 2002/0138582 A1 | 9/2002 | Chandra et al. |
| 6,952,714 B2 | 10/2005 | Peart | 2002/0138744 A1 | 9/2002 | Schleicher et al. |
| 6,952,724 B2 | 10/2005 | Prust | 2002/0144155 A1 | 10/2002 | Bate et al. |
| 6,980,993 B2 | 12/2005 | Horvitz et al. | 2002/0149888 A1 | 10/2002 | Motonishi et al. |
| 7,010,755 B2 | 3/2006 | Anderson et al. | 2002/0152262 A1 | 10/2002 | Arkin et al. |
| 7,024,427 B2 | 4/2006 | Bobbitt et al. | 2002/0152267 A1 | 10/2002 | Lennon |
| 7,028,262 B2 | 4/2006 | Estrada et al. | 2002/0156756 A1 | 10/2002 | Stanley et al. |
| 7,043,472 B2 | 5/2006 | Aridor et al. | 2002/0156895 A1 | 10/2002 | Brown |
| 7,047,498 B2 | 5/2006 | Lui et al. | 2002/0161800 A1 | 10/2002 | Eld et al. |
| 7,051,291 B2 | 5/2006 | Sciammarella et al. | 2002/0163572 A1 | 11/2002 | Center et al. |
| 7,062,500 B1 | 6/2006 | Hall et al. | 2002/0169678 A1 | 11/2002 | Chao et al. |
| 7,062,718 B2 | 6/2006 | Kodosky et al. | 2002/0174329 A1 | 11/2002 | Bowler et al. |
| 7,068,291 B1 | 6/2006 | Roberts et al. | 2002/0181398 A1 | 12/2002 | Szlam |
| 7,100,150 B2 | 8/2006 | Polk | 2002/0184357 A1 | 12/2002 | Traversat et al. |
| 7,106,843 B1 | 9/2006 | Gainsboro | 2002/0188605 A1 | 12/2002 | Adya et al. |
| 7,139,811 B2 | 11/2006 | Lev Ran et al. | 2002/0188621 A1 | 12/2002 | Flank et al. |
| 7,149,729 B2 | 12/2006 | Kaasten et al. | 2002/0188735 A1 | 12/2002 | Needham et al. |
| 7,168,051 B2 | 1/2007 | Robinson et al. | 2002/0194252 A1 | 12/2002 | Powers, III |
| 7,194,743 B2 | 3/2007 | Hayton et al. | 2002/0196276 A1 | 12/2002 | Corl et al. |
| 7,203,948 B2 | 4/2007 | Mukundan et al. | 2002/0199061 A1 | 12/2002 | Friedman et al. |
| 7,216,289 B2 | 5/2007 | Kagle et al. | 2003/0001964 A1 | 1/2003 | Masukura et al. |
| 7,216,301 B2 | 5/2007 | Moehrle | 2003/0009484 A1 | 1/2003 | Hamanaka et al. |
| 7,219,302 B1 | 5/2007 | O'Shaughnessy et al. | 2003/0014415 A1 | 1/2003 | Weiss et al. |
| 7,240,292 B2 | 7/2007 | Hally et al. | 2003/0018657 A1 | 1/2003 | Monday |
| 7,243,334 B1 | 7/2007 | Berger et al. | 2003/0018712 A1 | 1/2003 | Harrow et al. |
| 7,275,063 B2 * | 9/2007 | Horn .................. 707/102 | 2003/0028610 A1 | 2/2003 | Pearson |
| 7,290,245 B2 | 10/2007 | Skjolsvold | 2003/0033367 A1 | 2/2003 | Itoh |
| 7,293,031 B1 | 11/2007 | Dusker et al. | 2003/0037060 A1 | 2/2003 | Kuehnel |
| 7,383,494 B2 | 6/2008 | Krolczyk et al. | 2003/0041178 A1 | 2/2003 | Brouk et al. |
| 7,409,382 B2 | 8/2008 | Kido | 2003/0046260 A1 | 3/2003 | Satyanarayanan et al. |
| 7,415,484 B1 | 8/2008 | Tulkoff et al. | 2003/0063124 A1 | 4/2003 | Melhem et al. |
| 2001/0034733 A1 | 10/2001 | Prompt et al. | 2003/0069893 A1 | 4/2003 | Kanai et al. |
| 2001/0034771 A1 | 10/2001 | Hutsch et al. | 2003/0069908 A1 | 4/2003 | Anthony et al. |
| 2001/0047368 A1 | 11/2001 | Oshinsky et al. | 2003/0074356 A1 | 4/2003 | Kaier et al. |
| 2001/0049675 A1 | 12/2001 | Mandler et al. | 2003/0076322 A1 | 4/2003 | Ouzts et al. |
| 2001/0053996 A1 | 12/2001 | Atkinson | 2003/0078918 A1 | 4/2003 | Souvignier et al. |
| 2001/0056434 A1 | 12/2001 | Kaplan et al. | 2003/0079038 A1 | 4/2003 | Robbin et al. |
| 2001/0056508 A1 | 12/2001 | Arneson et al. | 2003/0081002 A1 | 5/2003 | De Vorchik et al. |
| 2002/0010736 A1 | 1/2002 | Marques et al. | 2003/0081007 A1 | 5/2003 | Cyr et al. |

| | | |
|---|---|---|
| 2003/0084425 A1 | 5/2003 | Glaser et al. |
| 2003/0085918 A1 | 5/2003 | Beaumont et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0097361 A1 | 5/2003 | Huang et al. |
| 2003/0098881 A1 | 5/2003 | Nolte et al. |
| 2003/0098893 A1 | 5/2003 | Makinen et al. |
| 2003/0101200 A1 | 5/2003 | Koyama et al. |
| 2003/0105745 A1 | 6/2003 | Davidson et al. |
| 2003/0107597 A1 | 6/2003 | Jameson |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120678 A1 | 6/2003 | Hill |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135513 A1 | 7/2003 | Quinn et al. |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Tararoukhine et al. |
| 2003/0184587 A1 | 10/2003 | Ording et al. |
| 2003/0195950 A1 | 10/2003 | Huang et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227480 A1 | 12/2003 | Polk |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0004638 A1 | 1/2004 | Babaria |
| 2004/0006549 A1 | 1/2004 | Mullins et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0019875 A1 | 1/2004 | Welch |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056894 A1 | 3/2004 | Zaika et al. |
| 2004/0056896 A1 | 3/2004 | Doblmayr et al. |
| 2004/0059755 A1* | 3/2004 | Farrington et al. .......... 707/200 |
| 2004/0068524 A1 | 4/2004 | Aboulhosn et al. |
| 2004/0070612 A1 | 4/2004 | Sinclair et al. |
| 2004/0073705 A1 | 4/2004 | Madril, Jr. et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103073 A1 | 5/2004 | Blake et al. |
| 2004/0103280 A1 | 5/2004 | Balfanz et al. |
| 2004/0105127 A1 | 6/2004 | Cudd et al. |
| 2004/0117358 A1 | 6/2004 | von Kaenel et al. |
| 2004/0117405 A1 | 6/2004 | Short et al. |
| 2004/0128322 A1 | 7/2004 | Nagy |
| 2004/0133572 A1 | 7/2004 | Bailey et al. |
| 2004/0133588 A1 | 7/2004 | Kiessig et al. |
| 2004/0133845 A1 | 7/2004 | Forstall et al. |
| 2004/0142749 A1 | 7/2004 | Ishimaru et al. |
| 2004/0143349 A1 | 7/2004 | Roberts et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0168118 A1 | 8/2004 | Wong et al. |
| 2004/0174396 A1 | 9/2004 | Jobs et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0181516 A1 | 9/2004 | Ellwanger et al. |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193599 A1 | 9/2004 | Liu et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0233235 A1 | 11/2004 | Rubin et al. |
| 2004/0243597 A1 | 12/2004 | Jensen et al. |
| 2004/0249902 A1 | 12/2004 | Tadayon et al. |
| 2004/0255048 A1 | 12/2004 | Lev Ran et al. |
| 2004/0257169 A1 | 12/2004 | Nelson |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0071355 A1 | 3/2005 | Cameron et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0131905 A1 | 6/2005 | Margolus et al. |
| 2005/0138567 A1 | 6/2005 | Smith et al. |
| 2005/0149481 A1 | 7/2005 | Hesselink et al. |
| 2005/0165753 A1 | 7/2005 | Chen et al. |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0053066 A1 | 3/2006 | Sherr et al. |
| 2006/0053388 A1 | 3/2006 | Michelman |
| 2006/0059204 A1 | 3/2006 | Borthakur et al. |
| 2006/0080308 A1 | 4/2006 | Carpentier et al. |

| | | | |
|---|---|---|---|
| 2006/0090137 | A1* | 4/2006 | Cheng et al. ............... 715/758 |
| 2006/0129627 | A1 | 6/2006 | Phillips et al. |
| 2006/0173873 | A1 | 8/2006 | Prompt et al. |
| 2006/0200455 | A1 | 9/2006 | Wilson |
| 2006/0200466 | A1 | 9/2006 | Kaasten et al. |
| 2006/0200832 | A1 | 9/2006 | Dutton |
| 2006/0218122 | A1 | 9/2006 | Poston et al. |
| 2006/0277432 | A1 | 12/2006 | Patel et al. |
| 2007/0168885 | A1 | 7/2007 | Muller et al. |
| 2007/0180432 | A1 | 8/2007 | Gassner et al. |
| 2007/0186183 | A1 | 8/2007 | Hudson, Jr. |

FOREIGN PATENT DOCUMENTS

| | | |
|---|---|---|
| GB | 2329492 | 3/1999 |
| JP | 09244940 | 9/1997 |
| JP | 2001067250 | 3/2001 |
| JP | 2001142766 | 5/2001 |
| JP | 2001154831 | 6/2001 |
| JP | 2001188702 | 7/2001 |
| JP | 2002099565 | 4/2002 |
| JP | 2002182953 | 6/2002 |
| JP | 2002334103 | 11/2002 |
| JP | 2002269145 | 4/2004 |
| WO | WO9322738 | 11/1993 |
| WO | WO9412944 | 6/1994 |
| WO | WO9414281 | 6/1994 |
| WO | 9938092 | 7/1999 |
| WO | WO9949663 | 9/1999 |
| WO | WO0051021 | 8/2000 |
| WO | 01/63919 A1 | 8/2001 |
| WO | WO0157867 | 8/2001 |
| WO | WO0167668 | 9/2001 |
| WO | WO 0225420 | 3/2002 |
| WO | WO03001720 | 1/2003 |
| WO | WO 2004107151 | 9/2004 |
| WO | WO2004097680 | 11/2004 |

OTHER PUBLICATIONS

Microsoft, Windows XP Professional, Screen Shots 1-8, copyright (1985-2001).*
Bott, et al., Book titled "Special Edition Using Windows 98, Second Edition", Dec. 21, 1999, second edition, pp. 1-7.
Supplementary European Search Report for EP 04780390 dated Jun. 18, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/wed/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
International Search Report and Written Opinion of PCT/US04/25931 dated Apr. 3, 2007.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay Mac OS X Unleashed, Nov. 2001, Sams, Chap. 4. The Finder: Working with Files and Applications (pp. 1-15), Getting File Information (pp. 1-7).
McFedries, Paul; "The Complete Idiot's Guide to Windows XP", Table of Contents, Oct. 3, 2001; Alpha Books, Ch. 6: Using My Computer to Fiddle w/h Files and Folder-printed pg. 1-6, Finding a File in Mess pg. 103.
Written Opinion of Singapore Application No. 200403220-7 dated May 18, 2006.
Microsoft Press Pass, "Windows XP is Here!", New York, Oct. 25, 2001.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unkown.
McFedries, Paul, "The Complete Idiot's Guide to Windows XP", Table of Contents, Oct. 3, 2001; Alpha Books, Chapter 8: A Tour of the My Pictures Folder—printed pages 1-8, Chapter 11: Sights and Sounds: Music and Other Multimedia-printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
European Search Report for 03007909.9-2211 dated Jun. 30, 2006.
D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Australian Search Report for SG 20031764-7 dated Mar. 30, 2006.
D. Esposito, Visual C++ Windows Shell Programming Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.
Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Wikipedia, File Allocation Table, 2006, <http://en.wikipedia.org/wiki/File_Allocation_Table>.
Cohen, et al., "A Case for Associative Peer to Peer Overlays" -ACM SIGCOMM Computer Communications Review, vol. 33, No. 1, Jan. 2003, pp. 95-100.
Lui, et al., "Interoperability of Peer-to-Peer File Sharing Protocols" -ACM SIGecom Exchanges, vol. 3, No. 3, Aug. 2002, pp. 25-33.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
A.T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages With Rules", Microsoft® Outlook® 2003 Help file, 3 pp.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PropSheetPage"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DrawItemStruct Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification"; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message"; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; dated of first publication prior to Mar. 31, 2005; 1 page.

"PSM_SETWIZBUTTONS Message"; downloaded from <http://msdn.microsoft.com>; date of first publication prior to Mar. 31, 2005; 2 pages.
"PropSheetHeader Structure"; downloaded from <http://msdn.microsoft.com>; date of first publication prior to Mar. 31, 2005; 5 pages.
"PropSheetPage Structure"; downloaded from <http://msdn.microsoft.com>; date of first publication prior to March 31, 2005; 4 pages.
"PSHNOTIFY Structure"; downloaded from <http://msdn.microsoft.com>; date of first publication prior to Mar. 31, 2005; 1 page.
"BCM_GETIDEALSIZE Message"; downloaded from <http://msdn.microsoft.com>; date of first publication prior to Mar. 31, 2005; 1 page.
"PSM_SETTITLE Message"; downloaded from <http://msdn.microsoft.com>; date of first publication prior to Mar. 31, 2005; 1 page.
Lee, J., "An End-User Perspective on File-Sharing Systems," Communications of the ACM 46(2):49-53, Feb. 2003.
Ohtani, A., et al., "A File Sharing Method For Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DuallFS: A New Journaling File System Without Meta-Data Duplication," Conference Proceedings of the 2002 International Conference on Supercomputing, New York, Jun. 22-26, 2002, p. 137-146.
Manber, U., and S. Wu, "Glimpse: A Tool to Search Through Entire File Systems," Proceedings of USENIX Winter 1994 Conference, San Francisce, Ca, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.

Templin, P.J. Jr., "Providing a Centralized File Sharing Resource at Bucknell University", Proceedings of the User Services Conference for College and University Computing Services Organization, Bloomington, Ind., Oct. 25-28, 1998, pp. 289-292.
Yamai, N. et al., "NFS-Based Secure File Sharing Over Multiple Administrative Domains With Minimal Administration," Systems and Computers in Japan 33(14):50-58, Dec. 2002.
Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde, et al., A Universal Framework for Managing Metadata in the Distributed Dragon Slayer System, Proceedings of the 26th EUROMICRO Conference (EUROMICRO'00), Vol. 2, Maastricht, The Netherlands, Sep. 5-7, 2000, pp. 96-101, IEEE Computer Society, 2000, ISBN 1089-6503.
Jolon Faichney, et al., Goldleaf Hierachical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.
Bipin C. Desal, et al., Resource Discovery: Modeling, Cataloguing And Searching, Seventh International Workshop on Database and Expert Systems Applications (DEXA'96), Zurich, Switzerland, Sep. 9-10, 1996, pp. 70-75, IEEE-CS Press, 1996, ISBN 0-8186-7662-0.
Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
"Predefined Properties" http://help.sap.comlsaphelp— ep50sp5/helpdata/en/la/9a4a3b80f2ec40aa7456bc87a94259/content.htm.
"Info Vision Infonnation Management System" http://66.1 02. 7.1 04/search?q=cache:m IXV6K6sQOQJ:www.amlib.netlproducts/infovision.htm+customised+multi+property+file+navigation &hl=en.
"Previewing Files in the Common Dialog" http://www.elitevb.comlcontentiO 1,0084,0 II.
"TdcFolderListView component" http://www.appcontrols.comlmanualdiskcontrols.index.htm1?tdcfolderlistview.htm.
"Previewing Files" http://developer.apple.comldocumentation/QuickTimeIINMAC/QT/iqMovieToolbox.1a.htm.
"Text File Previewer 2.0 Beta" http://www.freedownloadscenter.comlUtilitieslText-ViewerslText-File reviewer.html.
"Your Next OS: Windows 2006?" http://www.pcworld.comlnewsiarticle/O,aid,II3'63I,OO.asp.
"GetOpenFileName Function," downloaded from <http://msdn.microsoft.com>; date of first publication prior to Mar. 28, 2005; 2 pages.
"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Conversations: A Mixed-Model Visualization. Microsoft Research Technical Report MSR-TR-2002-102. Sep. 23, 2003 (Revised Jan. 13, 2003).

Microsoft Digital Image Suite User's Manual, Version 9.0. Pages 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

"About Dialog Boxes," date of first publication prior to Feb. 21, 2005, 10 pp., http://msdn.microsoft.com.

"About Managing Messages With Rules," Microsoft Outlook 2003 Help file, 3 pages.

Adobe Inc., et al., "Adobe Photoshop CS Classroom in a Book," Dec. 1, 2003, pp. 1-29.

Adobe Inc., et al., "Adobe Photoshop 7.0," 2001, pp. 1-9.

Anonymous, "Organize Your Digital Media Collection," Jun. 30, 2003, 3 pages, www.microsoft.com/windowsxp/using/windowsmediaplayer/getstarted/organize.mspx.

Australian Search Report for SG 200301757-1, Dec. 1, 2004.

Cohen, J. "The Unofficial Guide to the Workplace Shell," Apr. 5, 1992, 45 pages, http://www.verfasser.de/web/web.nsf/c5.

Cooper, A., "About Face The Essentials of User Interface Design," IDG Books, 1995, p. 141.

Campbell, David, "Extending the Windows Explorer with Name Space Extensions," Microsoft Systems Journal, Microsoft Corporation, vol. 5, No. 6, Jul. 1996, pp. 89-96.

Bott, Ed et al., "Master Your Music Library," May 5, 2003, 7 pages, www.microsoft.com/windowsxp/using/ windowsmediaplayer/expert/bott_03may05.mspx.

English translation of Office Action for CNO3801850.0 dated Aug. 10, 2007.

Esposito, Dino, "More Windows 2000 UI Goodies: Extending Explorer Views by Customizing Hypertext Template Files," first publication date prior to Jun. 16, 2006, 15 pages.

Examination Report for New Zealand Patent No. 534665, Jul. 27, 2007.

International Search Report and Written Opinion of PCT/USO4/25931, Apr. 3, 2007.

Louis, et al., "Context Learning Can Improve User Interaction Information Reuse and Integration," Proceedings of the 2004 IEEE International Conference, Nov. 8-10, 2004, pp. 115-120.

Rathbone, Andy, "Windows XP for Dummies," 2001, pp. 145, 203-204, Wiley Publishing, Inc.

Grosky, et al., "Using Metadata for Intelligent Browsing of Structured Media Objects," Dec. 1994, pp. 49-56, vol. 23, No. 4, Sigmond Record.

Sellen, Abigail J. et al., "How Knowledge Workers Use the Web," Proceedings of the SIGCHI Conference on Human Factors in Computing Systems: Changing Our World, Changing Ourselves, ACM, 2002, pp. 227-234.

International Search Report and Written Opinion of PCT/US05/26655, Mar. 21, 2006.

International Search Report for PCT Application Serial No. PCT/US05/13589, Dec. 7, 2005, 5 pages.

International Search Report for EP 03007786, Aug. 6, 2004.

International Search Report of EP 0315717, Aug. 26, 2003.

International Search Report of EP 03007909, Jun. 13, 2006.

International Search Report of PCT/US03/15625, Aug. 8, 2003.

International Search Report of PCT/US05/13589, Apr. 22, 2005.

International Search Report of PCT/US05/27258, Aug. 1, 2005.

Jamsa, K., "1001 Windows 98 Tips," 1998, 2 pages, Jamsa Press.

Japanese Patent Office, Notice of Rejection, Japanese Patent No. 2004-571417, Feb. 17, 2009, 10 pages.

Sekiguchi, Kumiko, "Visual Basic Q&A," MSDN Magazine 2001, No. 16, Jul. 18, 2001, pp. 97-103, ASCII Inc., Japan.

Capretz, Luiz F. et al., "Component-Based Software Development," Nov. 2001, pp. 1834-1837, IECON '01, The 27th Annual Conference of the IEEE Industrial Electronics Society.

Russionovich, Mark, "Internal Structure of NTFS4.0," Aug. 1, 2001, pp. 176-182, Nikkei Windows 2000, vol. 2, No. 53, Nikkei Business Publications, Inc., Japan.

Halvorson, Michael, et al, "Microsoft Office XP, Professional Office Manual," Jul. 23, 2001, pp. 78-80, first edition, Nikkei BP Soft Press.

Microsoft, "Microsoft Windows 2000 Professional Step by Step - Lesson 3 - Managing Files and Folders," first publication prior to Jun. 12, 2006, 12 pages, http://www.microsoft.com/mspress/books/sampshap/1589.asp.

Microsoft Corporation, "Windows 98 Step by Step," 1998, p. 63, Microsoft Press.

Microsoft Windows XP Version 2002 Screen Dumps.

Olivie, et al, "A Generic Metadata Query Tool," 1999, pp. 1-8.

Patent Abstracts of Japan, Publication No. 2002-099565, Information Retrieval Apparatus, Abstract, May 4, 2002, 1 page.

Patent Abstracts of Japan, Publication No. 2002-334103, Retrieval Processing System and Retrieval Processing Method, Abstract, Nov. 22, 2002, 1 page.

Dourish, Paul, et al., "Presto: An Experimental Architecture for Fluid Interactive Document Spaces," ACM Transactions on Computer - Human Interaction (TOCHI) Jun. 1999, pp. 133-161, vol, 6, Issue 2, ACM.

"PSHNOTIFY Structure," first publication prior to Mar. 31, 2005, 1 page, http://msdn.microsoft.com.

International Search Report for PCT/US06/26854, Sep. 25, 2007.

"PSM_ADDPAGE Message", date of first publication prior to Mar. 31, 2005, 2 pages, http://msdn.microsoft.com.

"PSM_HWNDTOINDEX Message," date of first publication prior to Mar. 31, 2005, 1 page, http://msdn.microsoft.com.

"PSM_IDTOINDEX Message," date of first publication prior to Mar. 31, 2005, 1 page, http://msdn.microsoft.com.

"PSM_INDEXTOHWND Message," date of first publication prior to Mar. 31, 2005, 1 page, http://msdn.microsoft.com.

"PSM_INDEXTOID Message," date of first publication prior to Mar. 31, 2005, 1 page, http://msdn.microsoft.com.

"PSM_INDEXTOPAGE Message," date of first publication prior to Mar. 31, 2005, 1 page, http://msdn.microsoft.com.

"PSM_PAGETOINDEX Message," date of first publication prior to Mar. 31, 2005, 1 page, http://msdn.microsoft.com.

"PSM_PRESSBUTTON Message," date of first publication prior to Mar. 31, 2005, 1 page, http://msdn.microsoft.com.

"PSM_QUERYSIBLINGS Message," date of first publication prior to Mar. 31, 2005, 1 page, http://msdn.microsoft. com.

"PSM_SETCURSEL Message," date of first publication prior to Mar. 31, 2005, 1 page, http://msdn.microsoft.com.

"PSM_SETCURSELID Message," date of first publication prior to Mar. 31, 2005, 1 page, http://msdn.microsoft.com.

"PSM_SETFINISHTEXT Message," date of first publication prior to Mar. 31, 2005, 1 page, http://msdn.microsoft.com.

"PSM_SETHEADERTITLE Message," date of first publication prior to Mar. 31, 2005, 1 page, http://msdn.microsoft.com.

"PSM_SETWIZBUTTONS Message," date of first publication prior to Mar. 31, 2005, 1 page, http://msdn.microsoft.com.

"Revelle, A Visual Search Tool for Early Elementary Science Students," Mar. 2002, pp. 49-57, vol. 11, Journal of Science Education and Technology.

Russian Official Action and English Translation of Official Action for Application No. 2003114526/09, May 11, 2007, 7 pages.

Northrup, Tony, et al., "Plus! Party Mode: Mix Audio and Video in Playlists," Mar. 17, 2003, 6 pages, www.microsoft.com/windowsxp/using/windowsmediaplayer/expert/northrup_03march17.mspx.

Windows Commander, first date of publication prior to Jul. 31, 2006, 7 pages, http://web.archive.org/web/20021017022627/www.ghisler.com/addons.htm, and http://web.archive.org/web/20021017022627/www.ghisler.com/addons.htm.

International Search Report for WO2004/097638 A1, Nov. 11, 2004.

* cited by examiner

MULTIPLE ROOTS IN NAVIGATION PANE

FIELD OF THE INVENTION

The invention relates generally to computers and user interaction with computers via a graphical user interface. More specifically, the invention relates to a method and a system of configuring and accessing a hierarchical data or application structure by creating and customizing multiple roots in a navigation pane.

BACKGROUND OF THE INVENTION

In the following, the Windows® brand operating system is used in various examples, although the use of the invention is not restricted to the Windows®-based operating systems. Microsoft® Windows® brand and similar operating systems with graphical user interfaces commonly utilize navigation trees to facilitate access to applications or data. These known navigation trees organize data and/or applications into a hierarchical structure based on a single root with folders or other data structures branching off from the root corresponding to its position in the hierarchy. For example, in previous operating systems like the one illustrated in FIG. 2, a navigation tree is typically rooted in the "Desktop" with structures such as the "My Documents" folder and the "My Computer" structure branching off of the "Desktop." Other data structures such as "Local Disk (C:)" and "My Pictures" branch off from "My Computer" and "My Documents," their respective parent structures, in the data hierarchy. Thus, depending on the number of data structures such as physical and virtual folders, and storage devices (e.g., hard drives, optical disks, mass storage devices, removable storage devices, etc.), the navigation tree may be expandable to a significant number of levels, making navigation cumbersome and inefficient.

Navigation trees are often useful in navigating to a particular storage location (e.g., a subfolder or storage drive identified within the navigation tree) without requiring a user to first open each of the parent structures. That is, the user can merely expand the parent nodes to display the sought after storage location, then select the node representative of the sought after location. Navigation trees also facilitate viewing ancestral, descendant, and sibling relationships between various structures that may not have a direct parent-child association. However, with increasing storage capacity in even home computers, having only a single root in a navigation tree may require substantial time and effort to locate or access a particular page or storage location. In many instances, the considerable expansion of the navigation tree makes it especially difficult to view the relative locations of two different structures. For example, a user may search through a navigation tree for two particular folders. However, upon expansion of the tree, the folders become increasingly separated by an ever growing number of irrelevant nodes. As such, the substantial expansion of the navigation tree requires the user to either scroll up and down through the navigation tree to view the two relevant folders, or to open a second window in order to view one folder in each window. Moreover, such multi-level navigation requires the user to remember every parent structure, grandparent structure, etc. to efficiently navigate the tree. Thus, navigation quickly becomes increasingly tedious the deeper a desired folder or page is located in the navigation tree.

Additionally, current navigation systems only incorporate a single root. As a result, the navigation tree restricts the organization of a user's folders and other structures to a single representation. Such a restriction may pose substantial obstacles to efficiently viewing and navigating folders of comparable relevancy. In one example, a user may have limited space on each of his or her storage drives and is therefore forced to store his or her photographs on two separate drives. In known single root solutions, the user is forced to access both storage areas by expanding the navigation tree significantly at two different storage points. Such a method of navigation hinders viewing both sets of photographs simultaneously.

For at least the foregoing reasons, a method and system of enhancing the organization, accessibility and customizability of navigation controls is needed.

BRIEF SUMMARY OF THE INVENTION

One or more illustrative aspects of the present invention solve the aforementioned problems by providing a method and system of creating and customizing multiple roots in a navigation pane. With such a system, a user may be able to bypass needless navigation by allowing direct access to relevant documents, applications and other data through such alternative roots. A user may customize a navigation pane by dragging a desired root or structure to a specific position in the navigation pane. Alternatively, the system may further comprise a customization dialog that permits the user to systematically add and remove roots through a menu type system. The user may further organize and reorganize the roots in a navigation pane by clicking and dragging the roots to particular positions relative to the other roots on the pane. Dragging the roots to the desktop may further create a shortcut to that root. Users may further have the option of adjusting the properties of each root, allowing further customizability.

According to an aspect of the invention, the multiple roots system permits roots to comprise other types of nodes beyond the typical physical locations (i.e., physical folders) used in current systems. More specifically, the multiple roots system allows users to define lists and autolists as roots in the navigation pane. These lists and autolists may comprise files or other data that satisfy a specified set of rules or filters. Additionally, roots may comprise custom extensions that correspond to a user's email (i.e., MSN® Hotmail Drive). These enhancements to the navigation system permit the user significantly greater flexibility in customizing a preferred set of navigation controls in a variety of applications.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
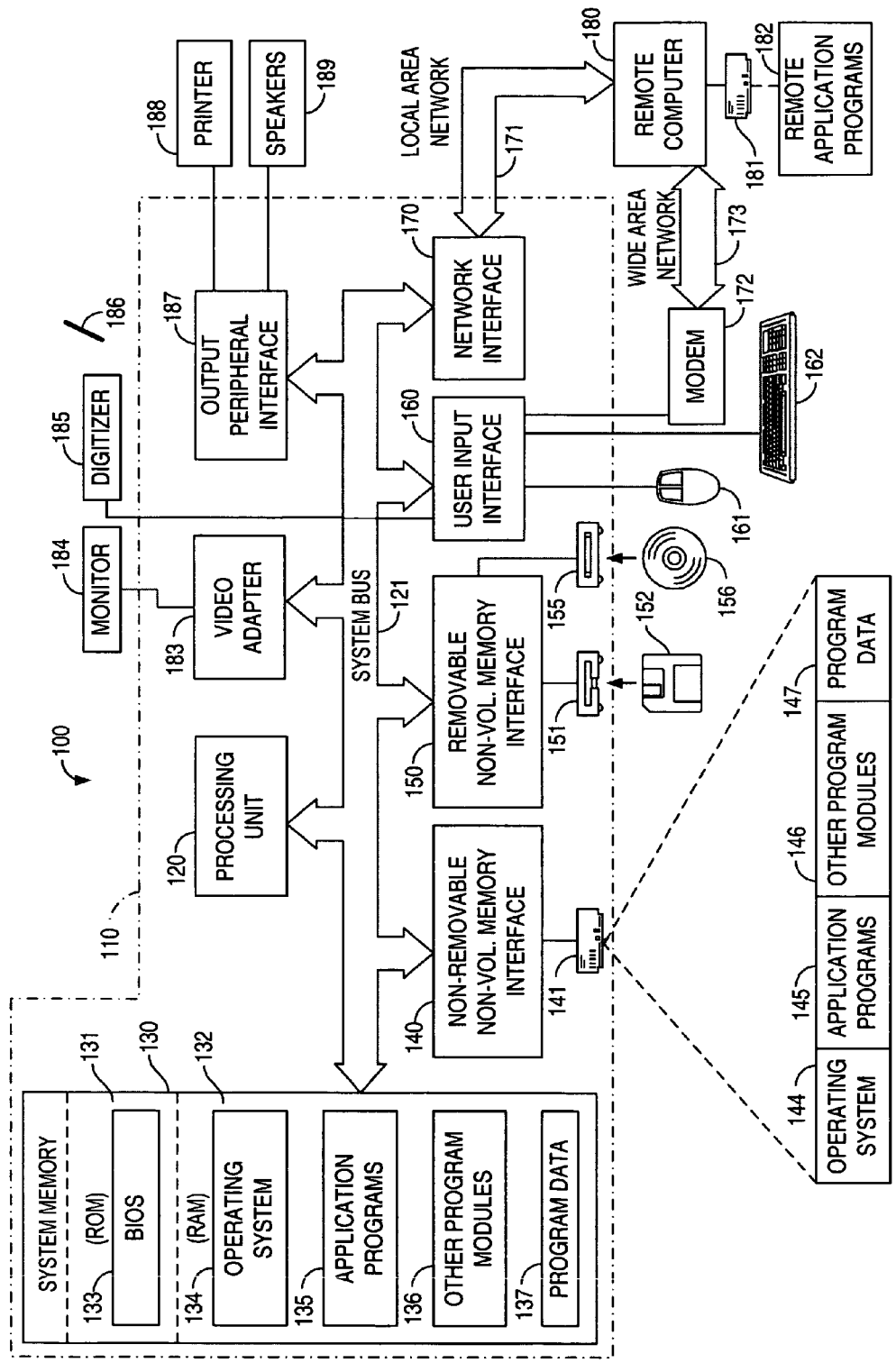
FIG. 1 illustrates an example of a suitable computing environment in which one or more illustrative aspects of the invention may be implemented.
Figure 2:
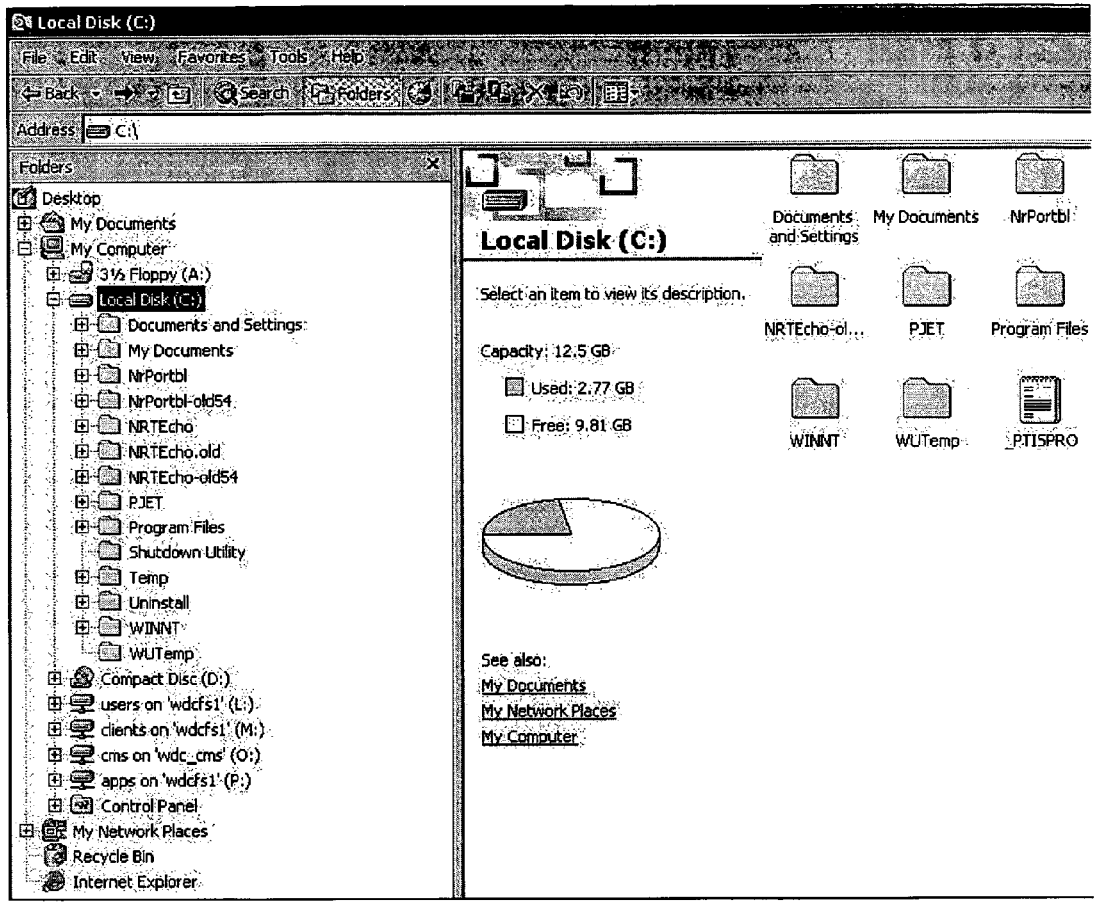
FIG. 2 illustrates a prior art shell browser system comprising a single root navigation pane.

FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and handheld devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Figure 3:
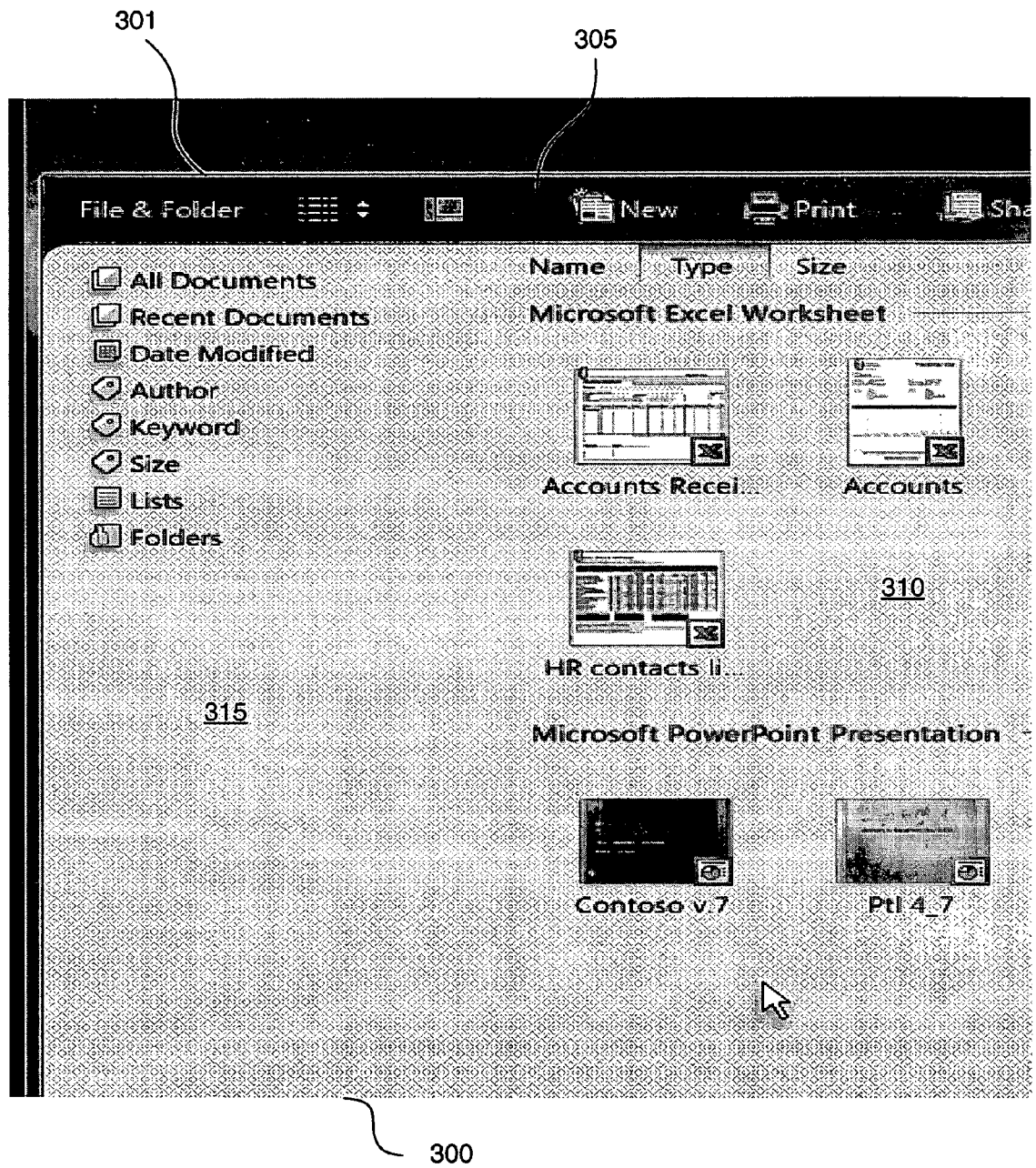
FIG. 3 illustrates a partial screenshot of a shell browser window implementing a multiple root navigation pane according to an illustrative embodiment of the present invention.

FIG. 3 illustrates a partial screenshot 300 of a shell browser window implementing a multiple root navigation pane according to an illustrative embodiment of the present invention. The shell browser window 301 is comprised of a menu bar 305 spanning the top of the window, a shell browser pane 310 on the right side and a multiple root navigation pane 315 along the left side of shell browser window 301. The implementation of a multiple root navigation pane within the shell browser window 301 allows a user significant flexibility in navigating, as described herein. A user may either browse files and/or data by accessing individual folders or pages via page views in shell browser pane 310 or navigate using the navigation pane 315 by jumping directly to desired nodes representative of documents or files corresponding to a page view. As used herein, a page refers to a collection of related documents; a page view refers to a graphical display of data items in a particular page; and a page node refers to an iconic or graphical representation of a particular page. Each page may include and/or represent static lists, auto-lists, physical folders, virtual folders, and any other structure or data collection of related files, data, or pages, and each page displayed in shell browser pane 310 may have a corresponding node displayed in navigation pane 315, as further described below. The ability to view both shell browser pane 310 and navigation pane 315 simultaneously facilitates many of the customization options associated with a multiple root navigation pane 315. For example, folders or lists may be dragged from the shell browser pane 310 to the navigation pane 315 to define an additional root in the navigation pane 315. In a navigation pane, a root node generally relates to a page node that lacks a parent page node. According to an aspect of the invention, each root node in the navigation page might have a parent node, however, the navigation pane does not display any parents of a node identified as a root node. The user is thus unable to navigate to the parent of a root node, when one exists, via that root node itself.

Figure 4:
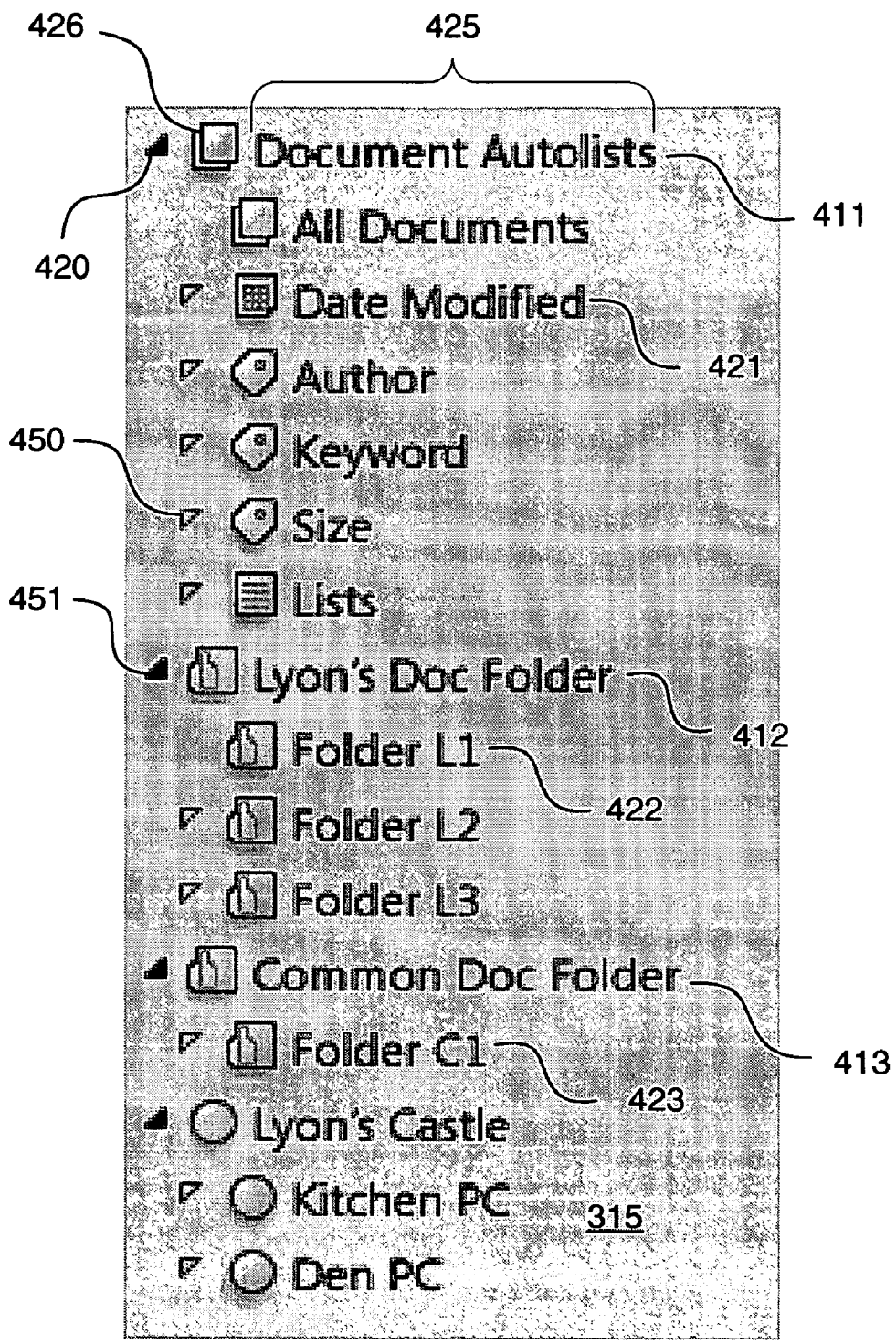
FIG. 4 illustrates a multiple root navigation pane according to an illustrative embodiment of the present invention.

FIG. 4 illustrates a multiple root navigation pane according an illustrative embodiment of the present invention. The multiple root navigation pane 315 may comprise multiple root nodes 411, 412 & 413. Root nodes are commonly used as a starting point for navigating through data stored on a device such as a hard disk. Navigation pane 315 combines root nodes 411, 412 & 413, with any expanded descendant nodes, to graphically illustrate the organization of data. In one hierarchical representation, root nodes 411, 412 & 413 may be aligned along a single vertical axis in the navigation pane 315 to convey their status as root nodes. Accordingly, child pages 421, 422 & 423 of root nodes 411, 412 & 413, respectively, may be positioned below its respective root node and aligned on a second vertical axis located to the right of the vertical axis of root nodes 411, 412 & 413. A first page or node is said to be a descendant of a second page or node if the first page immediately depends on the second page. The relative positioning of the root nodes 411, 412 & 413 and descendent page nodes 421, 422 & 423 graphically delineates their hierarchical relationship. Further levels (e.g., descendants of descendants of a root node) of the storage hierarchy may be represented on the navigation pane 315 following the above described scheme using the position of a parent page node for orientation. One of skill in the art will appreciate that numerous ancestor/descendant orientation schemes may be utilized to represent the hierarchical relationship of a root node and its descendants, as is known in the art.

Each root node 411, 412 & 413 and descendent page nodes 421, 422, 423 may further comprise an expansion control widget 420, an identifying icon 426 and identification text 425. Generally, identification text 425 conveys the general category or description of the pages or files stored therein. For example, root node 411 may be labeled with "Lyon's Doc Folder" to identify the contents of that page as documents belonging to user Lyon. An identifying icon 426 may be positioned adjacent to the identification text 425 to allow a user to graphically differentiate between one or more root nodes 411, 412 & 413 or page nodes 421, 422 & 423. For instance, a user may create a unique icon to mark his or her ownership of certain pages or to indicate a type of files stored at the represented location. Similarly, users may use different icons to represent different types of pages (i.e., folders, lists, autolists). To access a page node and view its contents, a user may either double-click the identification text 425 or toggle the expansion control widget 420 associated with the particular node. By using either of these methods, the user may expand the parent page node thereby revealing its descendant nodes. The absence of an expansion control widget 420 may signal that the page node has no descendants and thus, cannot be expanded. If an expansion control widget 420 does exist, the control widget 420 may change to the corresponding page node's current state (i.e., expanded or collapsed). For example, the expansion control widget 420 may comprise a clear arrowhead 450 pointing away from the identifying text 425 when the page node is collapsed (i.e., hiding its descendant nodes). Conversely, if the page node is in an expanded state, the expansion control widget 420 may comprise a darkened arrowhead 451 pointing toward the displayed descendants of that page node. The expansion control widget 420 may be implemented in numerous ways and using a variety of symbols, colors and/or animations, such as '+' and '−', as is known in the art.

Figure 5A:
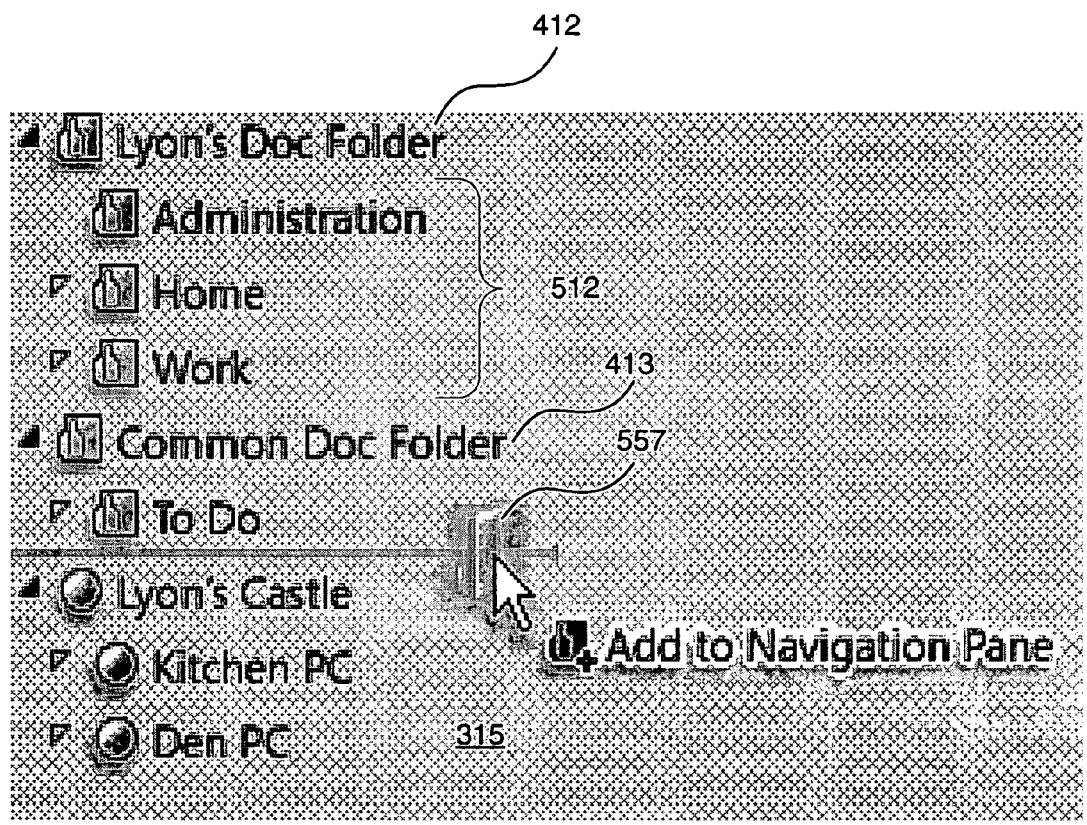
FIG. 5A illustrates a method for customizing a navigation pane according to an illustrative embodiment of the present invention.

FIG. 5A illustrates a method for customizing a navigation pane according to an illustrative embodiment of the present invention. A user may customize a navigation pane 315 in a variety of ways including adding new root nodes, removing existing root nodes, modifying the order of page nodes as they appear in the pane and creating shortcuts to pages or root nodes. In this embodiment, the method for customizing a navigation pane permits a user to add a node representing a specified page to the pane 315 as a root node. The addition of new root nodes facilitates navigating to oft-used pages by circumventing irrelevant parent pages. To add a new root node, a user may initially locate the desired page 557 using shell browsing methods generally known in the art. For example, a user may locate the desired page 557 using the shell browser pane 310 of FIG. 3. After locating the desired page 557, the user may then select and drag the page 557 from the shell browser pane 310 (FIG. 3) to the navigation pane 315 as shown in the illustration.

Upon receiving a user request for the creation of a new root node, the navigation pane 315 may identify the page type, acquire the page's physical location, determine the page's descendants and create a root node comprising a pointer to the page's physical location and an expandable/collapsible list of descendants. In contrast to a simple pointer or shortcut, a root node is a dynamic tool that permits a user to not only view a corresponding page by selecting the node, but also to view or hide (i.e., expand or collapse) an associated list of descendants. For example, if a user wants to make the folder "Louie's Documents" a root node in the navigation pane 315, the navigation pane 315 will identify that it is a folder page type. Subsequently, the navigation pane 315 will create a node structure in the pane 315 with the name "Louie's Documents" pointing to the physical or virtual location of "Louie's Documents." When a root node represents a static or dynamic list, the root node may store information identifying a location of the definition of the list to which it refers. Additional pages/root nodes may be similarly added to the navigation pane 315. In one embodiment of the present invention, the list of root nodes is stored in a registry that may comprise data and settings corresponding to system options, hardware and the like. Storage in a medium such as a registry allows a custom list of root nodes in a navigation pane to persist from browsing session to browsing session. Those of ordinary skill in the art will appreciate that the list of nodes may be stored using an array of other methods and in a variety of other mediums.

The user may remove a preexisting root node 412 from the navigation pane 315 by using a remove option available in a context menu. In one embodiment of the invention, the user may access the context menu of a particular root node 412 by selecting and/or right-clicking (i.e., using a mouse) on root node 412. Once the user selects the remove option from the context menu, the navigation pane 315 removes the selected root node 412 and its associated list of descendants 512.

Figure 5B:
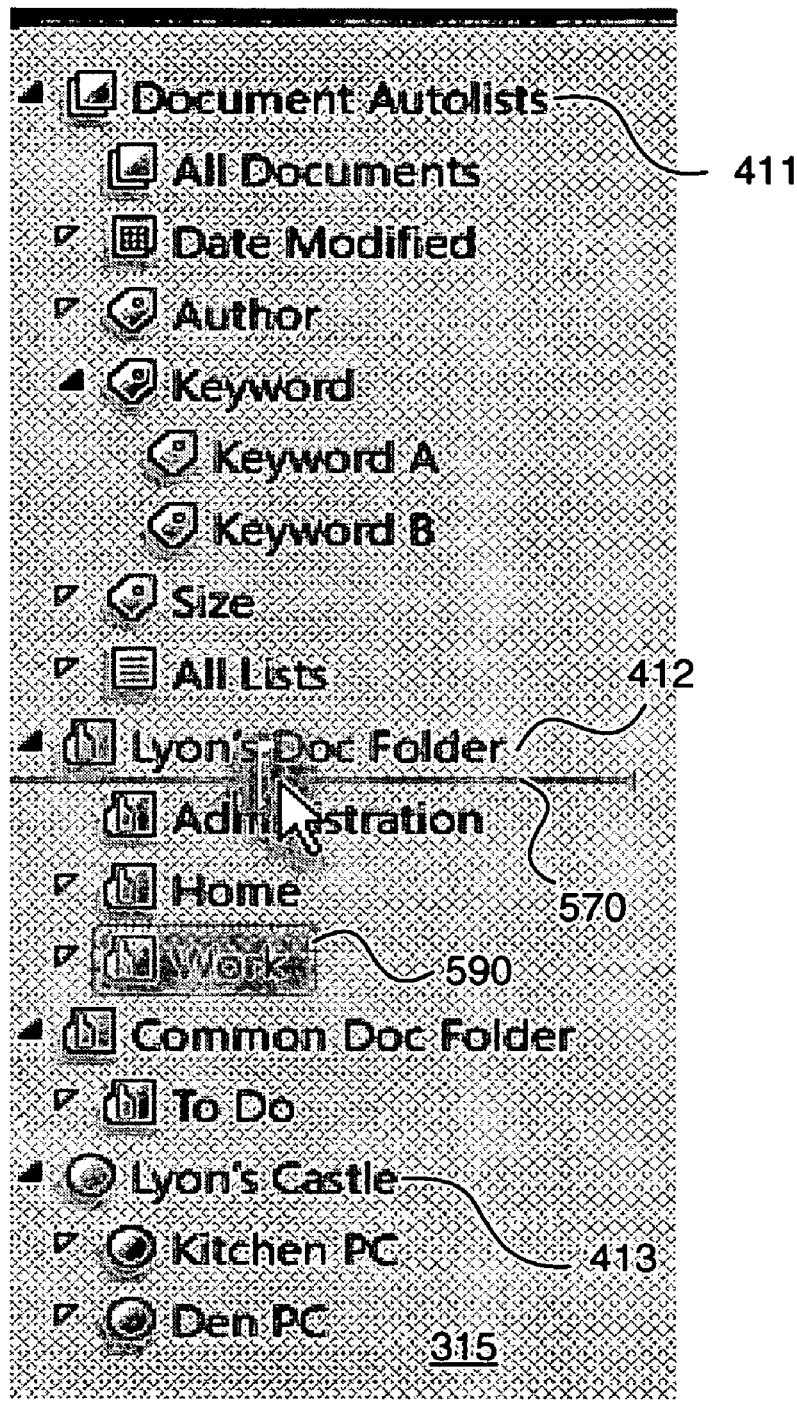
FIG. 5B illustrates a method for reordering page nodes in a multi root navigation pane according to an illustrative embodiment of the present invention.

Referring to FIG. 5B, a user may further adjust the ordering of the root nodes 411, 412 & 413 by selecting and dragging root nodes 411, 412 & 413 to their preferred locations in navigation pane 315. The user may similarly reorder sibling nodes having a common parent. The destination location may be identified by a position indicator 570 to ensure accurate relocation of root nodes. For example, a user may reorganize Lyon's Doc Folder 412 by dragging Work page 590 to the location identified by position indicator 570. Alternatively, a user may drag an existing page on the navigation pane 315 to a desktop. By doing so, the user may create a shortcut on the desktop to the selected page without removing the page node from the navigation pane 315. In such an instance, the navigation pane 315 may create a copy of the node pointer and place that copy on the desktop. Yet another alternative (not shown) permits a user to pin a parent and child node so that they appear on the same hierarchical level. For instance, a user may pin "Lyon's Doc Folder" 412 and child folder "Work" 590. By pinning the parent and child folder, "Lyon's Doc Folder" 412 and "Work" 590 appear on the same hierarchical level in the navigation pane without actually modifying the underlying structure. Such a feature allows a user to temporarily modify the hierarchical view of the navigation pane without making permanent changes.

Figure 6:
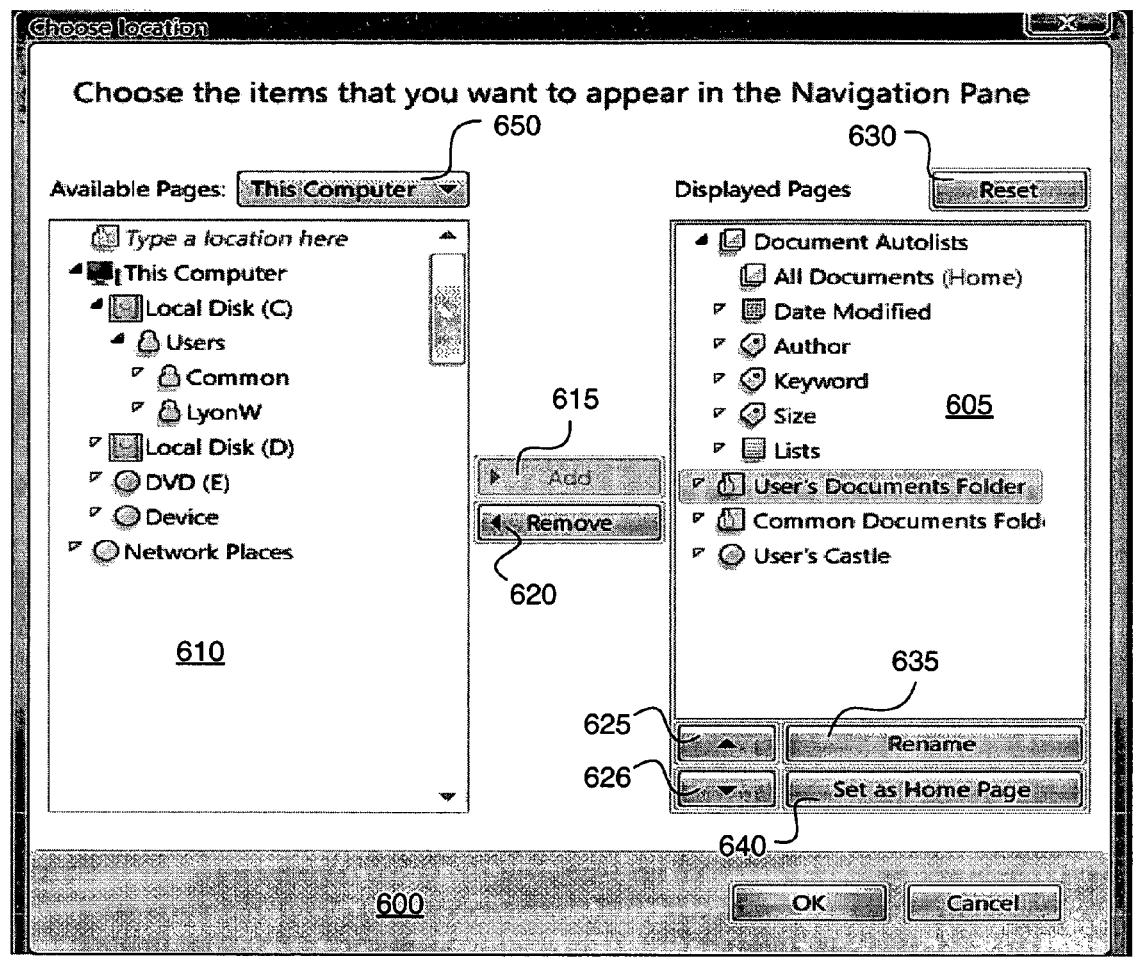
FIG. 6 illustrates a configuration dialog for customizing the navigation pane according to an illustrative embodiment of the present invention.

A user may also add, remove, rename and/or reorder root nodes using a configuration dialog similar to that illustrated in FIG. 6 according to an illustrative embodiment of the invention. The configuration dialog 600 may comprise a displayed pages pane 605, an available pages pane 610, an add button 615, a remove button 620, reordering buttons 625 & 626, a reset button 630, a rename button 635 and a set as homepage option 640. The configuration dialog 600 permits users to view a list of available pages in one pane 610 while modifying the contents of the navigation pane in the displayed pages pane 605. The available pages pane 610 displays a list of selectable pages that correspond to a selected location. A user may change the selected location by using a drop-down menu 650. Once the user has a list of available pages, the user may then select an available page and choose add option 615 to create a new root node corresponding to the selected page. Displayed pages pane 605 may automatically update its contents to reflect the addition of new root nodes. In other words, upon detection of a change the configuration dialog 600 may refresh panes 605 & 610 to reflect the most current information.

If the user wants to remove a current root node, the user may select the root node in the displayed pages pane 605 and choose the remove option 620. Upon removing the root node, the navigation pane disassociates the node with the corresponding page and removes the node from the pane. Other options permit the user to rename a current root node or set a root node as the home page. A user may reorder a root node in the displayed pages pane 605 by selecting a node and adjusting its relative position using arrow buttons 625 & 626. Should the user make a mistake in adding, removing, reordering or renaming one or more root nodes, the user has the reset option 630 to reset the changes he or she made to the navigation pane. Selecting reset button 630 may revert any changes made by the user since the window 600 was last opened, or may revert to a default state, undoing any changes the user has made.

Figure 7A:
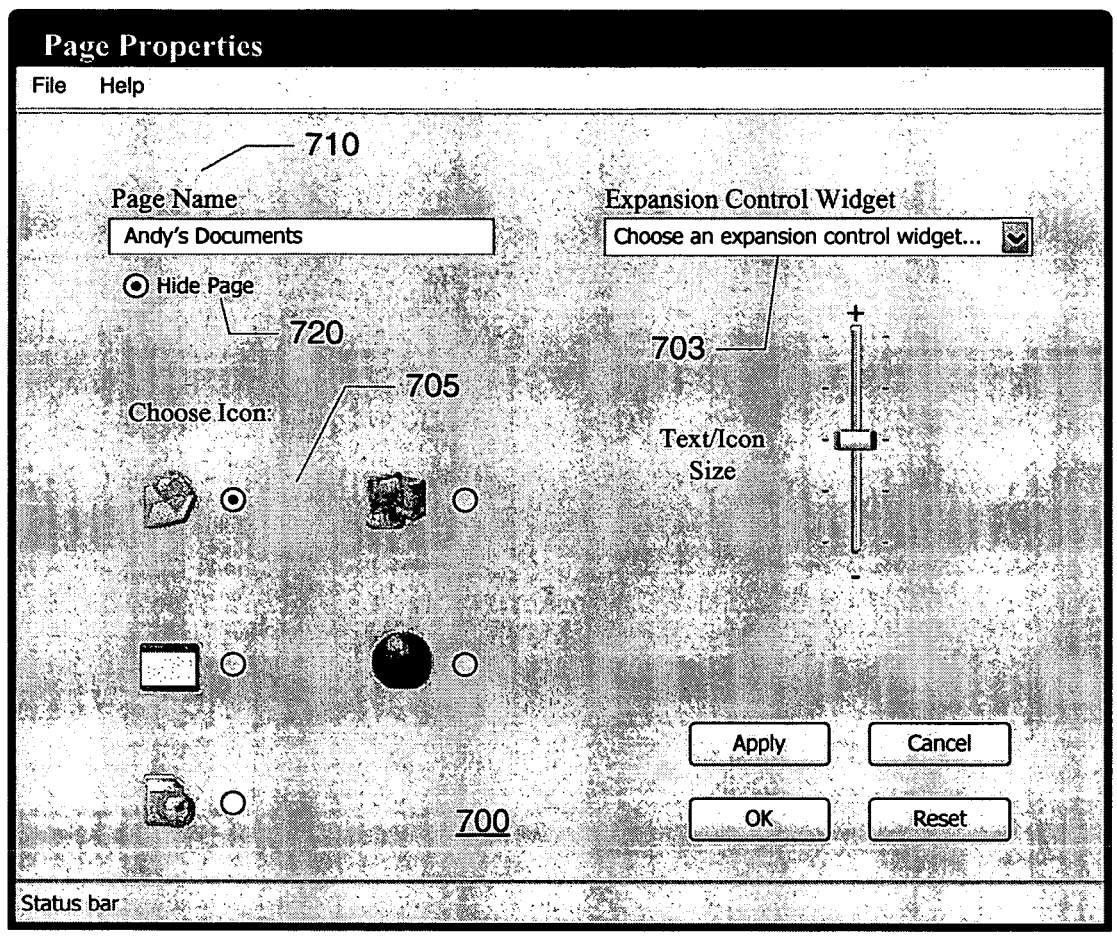
FIG. 7A illustrates a page node property configuration dialog according to one embodiment of the present invention.

FIG. 7A illustrates a page property dialog for customizing page nodes according to an illustrative embodiment of the present invention. A user may configure the aforementioned properties of a specified page node through a property dialog 700. The property dialog 700 may comprise an expansion control selection tool 703, icon selection tool 605, an identifying text changing tool 710, a size selection bar 715 and a hide option 720. The expansion control selection tool 703 and icon selection tool 705 provide the user with the flexibility to change the expansion control icon (e.g., to '+' and '−' as in previous operating systems) and the representative icon adjoining the identifying text. The expansion control selection tool 703 and icon selection tool 705 may be implemented through a drop-down list or through a shell browser utility that permits a user to search through and select from a database of images and icons. With regard to the expansion control selection tool 703, a user may be asked to select two images to represent each of a collapsed and expanded state. Alternatively, the selection tools 703 and 705 may comprise a predefined menu of available icons or images. Once the user has selected an icon, he or she may have the option to preview the change prior to applying it to the page node.

In addition, a user may change the substance and appearance of the identification text of the page node and the underlying page. This may be accomplished by editing the text within the navigation pane or, alternatively, through the property dialog 700. The property dialog 700 may comprise options for adjusting font, font size, style (italics, bold, smallcaps, etc.) and color. For example, a user may increase the font size and alter the font color of a page of particular significance or importance and its representative node. Such features may allow a user to identify to others that the page is of high importance or relevance.

Figure 7B:
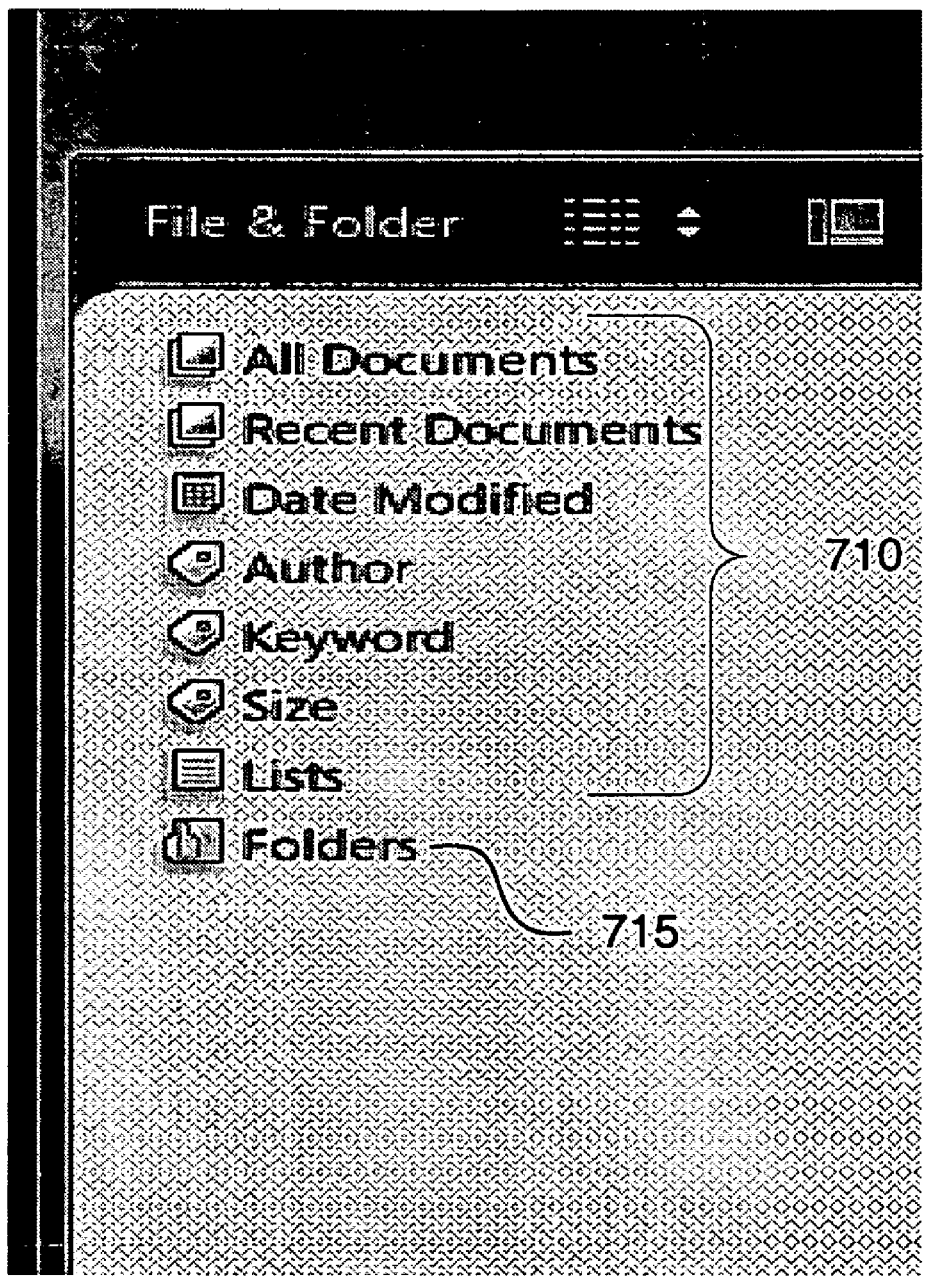
FIG. 7B illustrates a multi root navigation pane with an invisible root according to an illustrative embodiment of the present invention.

A further option of the page property configuration dialog 700 may allow a user to hide a page node in the navigation pane so that the page node is not visible when viewing the navigation pane. In one embodiment of the invention, when a page node is hidden, its descendant nodes may be elevated to root node status in the navigation pane. Thus, a hide option permits a user to create several root nodes simultaneously. A navigation pane comprising a hidden page node is illustrated in FIG. 7B. Group 710 comprises descendant page nodes of the hidden Autolist root node while the Folders page node 715, not related to the hidden node, is also visible. Hiding a particular root node may also be advantageous when a user is working extensively with the pages dependent on the hidden root node. By hiding the node, a user is not required to continuously expand and collapse the root node to interact with the children nodes.

The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. A method for allowing a user to interact with multiple root nodes displayed in a navigation pane of a shell browser window displayed as part of a graphical user interface on a display device connected to a data processing device, said shell browser being usable for navigating data stored on the data processing device, comprising steps of:

displaying a first root node in the navigation pane of the shell browser window, said first root node corresponding to a first collection of related data items, wherein said first root node is selectable to display in the shell browser window a first page view of the first collection of related data items, and wherein said first root node is selectable to display in the navigation pane one or more children nodes of said first root node;

creating a second root node representing a second collection of related data items to be simultaneously displayed with said first root node, said second root node is a former descendent of the first root node, wherein creation of the second root node creates the visual appearance that said second collection of related data is a root node without actually modifying the underlying structure of said data processing device;

simultaneously displaying said second root node in the navigation pane of the shell browser window, wherein said second root node is selectable to display in the shell browser window a second page view of the second collection of related data items, and wherein said second root node is selectable to display in the navigation pane one or more children nodes of said second root node; and responsive to user input, reordering the first root node and the second root node in the navigation pane, wherein the second root node is ordered in a position before the first root node.

2. The method of claim 1, further comprising hiding the first root node to create one or more new root nodes, said one or more new root nodes being any children of the hidden first root node.

3. The method of claim 1, further comprising the step of ordering the first and second root nodes in the navigation pane responsive to user input.

4. The method of claim 3, wherein the user input comprises selecting the first root node, and dragging and dropping the first root node in a desired location in the navigation pane.

5. The method of claim 3, wherein the user input comprises selecting an ordering scheme from a plurality of ordering schemes.

6. The method of claim 1, further comprising:

responsive to user input comprising selecting a new root node from a plurality of data items displayed in the shell browser window, and dragging and dropping the new root node in the displayed navigation pane, simultaneously displaying the third root node in the navigation pane of the shell browser window, said third root node corresponding to a third collection of related data items, wherein said third root node is selectable to display a third page view of the third collection of related data items.

7. The method of claim 1, wherein the first root node corresponds to a virtual folder defined by an autolist on the data processing device.

8. The method of claim 1, wherein the first root node corresponds to a static list on the data processing device.

9. The method of claim 1, wherein the first root node corresponds to a network accessible location.

10. The method of claim 1, wherein the first root node corresponds to a shared location on the data processing device.

11. The method of claim 1, further comprising displaying a second window through which a user can add root nodes to and remove root nodes from display in the navigation pane.

12. A computer readable storage medium storing computer executable instructions that, when executed by a data processing device, perform a method for allowing a user to interact with multiple root nodes displayed in a navigation pane of a shell browser window displayed as part of a graphical user interface on a display device connected to the data processing device, said shell browser being usable for navigating data stored on the data processing device, wherein a root node is a node that appears to lack a parent node, said method comprising steps of:
displaying a first root node in the navigation pane of the shell browser window, said first root node corresponding to a first collection of related data items, wherein said first root node is selectable to display in the shell browser window a first page view of the first collection of related data items, and wherein said first root node is selectable to display in the navigation pane one or more children nodes of said first root node;
creating a second root node representing a second collection of related shell data items to be simultaneously displayed with said first root node, said second root node is a former descendent of the first root node, wherein creation of the second root node creates the visual appearance that said second root node is a root node without actually modifying the underlying structure of said data processing device;
responsive to user input, reordering the first root node and the second root node in the navigation pane, wherein the second root node is ordered in a position before the first root node; and
simultaneously displaying said second root node in the navigation pane of the shell browser window, wherein said second root node is selectable to display in the shell browser window a second page view of the second collection of related data items, and wherein said second root node is selectable to display in the navigation pane one or more children nodes of said second root node.

13. The computer readable medium of claim 12 wherein said method further comprises hiding the first root node to create one or more new root nodes, said one or more new root nodes being any children of the hidden first root node.

14. The computer readable medium of claim 12, wherein the method further comprises the step of ordering the first and second root nodes in the navigation pane responsive to additional user input.

15. The computer readable medium of claim 14, wherein the user input comprises selecting an ordering scheme from one or more ordering schemes.

16. The computer readable medium of claim 12, wherein the method further comprises:
responsive to user input comprising selecting a new root node from a plurality of data items displayed in the shell browser window, and dragging and dropping the new root node in the displayed navigation pane, simultaneously displaying the third root node in the navigation pane of the shell browser window, said third root node corresponding to a third collection of related data items, wherein said third root node is selectable to display a third page view of the third collection of related data items.

17. The computer readable medium of claim 12, wherein the first root node corresponds to a virtual folder defined by an autolist on the data processing device.

18. The computer readable medium of claim 12, wherein the first root node corresponds to a shared location on the data processing device.

19. A computer readable storage medium storing computer executable instructions that, when executed by a data processing device, perform a method for allowing a user to interact with multiple root nodes displayed in a navigation pane of a shell browser window displayed as part of a graphical user interface on a display device connected to the data processing device, said shell browser being usable for navigating data stored on the data processing device, wherein a root node is a node that appears to lack a parent node, said method comprising steps of:
displaying a first root node in the navigation pane of the shell browser window, said first root node corresponding to a first collection of related data items, wherein said first root node is selectable to display in the shell browser window a first page view of the first collection of related data items, and wherein said first root node is selectable to display in the navigation pane one or more children nodes of said first root node;
receiving a request for the creation of a second root node based on a member of said first collection of related data items, wherein said request is made by said user;
acquiring the member's physical location within the underlying data structure of said data processing device;
determining the member's descendants, wherein a second collection of related data items is comprised of said descendants;
creating said second root node, wherein said second root node comprises a pointer to said member's physical location and an expandable list of descendants; and
displaying said second root node in the navigation pane of the shell browser window simultaneously to said displaying of said first root node, wherein said second root node is selectable to display in the shell browser window a second page view of the second collection of related data items, and wherein said second root node is selectable to display in the navigation pane one or more children nodes of said second root node.

* * * * *

UNITED STATES PATENT AND TRADEMARK OFFICE
CERTIFICATE OF CORRECTION

PATENT NO.       : 7,614,016 B2                                    Page 1 of 1
APPLICATION NO.  : 11/110770
DATED            : November 3, 2009
INVENTOR(S)      : Wong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this

Nineteenth Day of October, 2010

David J. Kappos
*Director of the United States Patent and Trademark Office*